United States Patent
Jung et al.

(10) Patent No.: US 12,145,298 B2
(45) Date of Patent: Nov. 19, 2024

(54) SYMBOL BUTTON FOR VEHICLE AND MANUFACTURING METHOD THEREOF

(71) Applicants: Hyundai Motor Company, Seoul (KR); Kia Corporation, Seoul (KR)

(72) Inventors: Woo Chul Jung, Gyeonggi-do (KR); Sung Ho Yoon, Gyeonggi-do (KR); Jae Sik Seo, Gyeonggi-do (KR); Choon Soo Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 158 days.

(21) Appl. No.: 17/945,246

(22) Filed: Sep. 15, 2022

(65) Prior Publication Data
US 2023/0001610 A1    Jan. 5, 2023

Related U.S. Application Data

(62) Division of application No. 16/568,838, filed on Sep. 12, 2019, now Pat. No. 11,478,963.

(30) Foreign Application Priority Data

Dec. 7, 2018  (KR) .................. 10-2018-0157493

(51) Int. Cl.
*B29C 45/00* (2006.01)
*B29C 45/16* (2006.01)
(Continued)

(52) U.S. Cl.
CPC .......... *B29C 45/0001* (2013.01); *B29C 45/16* (2013.01); *B29D 19/04* (2013.01);
(Continued)

(58) Field of Classification Search
CPC ............ B29C 45/0003; B29C 45/0055; B29C 2045/0058; B29C 2045/0079;
(Continued)

(56) References Cited

U.S. PATENT DOCUMENTS 3,764,487 A * 10/1973 Yamamoto .......... C23C 18/1605
                                                     427/322
4,158,612 A *  6/1979 Luch .................. C25C 7/02
                                                     204/281
(Continued)

FOREIGN PATENT DOCUMENTS

CN        1208883 A     2/1999
CN        2470930 Y     1/2002
(Continued)

OTHER PUBLICATIONS

Office Action issued Nov. 17, 2023 in corresponding Chinese Application No. CN 201910907615.5.

*Primary Examiner* — Matthew J Daniels
(74) *Attorney, Agent, or Firm* — Fox Rothschild LLP

(57) ABSTRACT

A manufacturing method of a symbol button for a vehicle includes: preparing a button body comprising a side portion, a top portion formed of a polymer material on which a metal is able to be plated; forming an electrically conductive layer on an outside of the button body using a conductive polymer material; forming a plating shielding layer in a form of a symbol using a material on which a metal is not able to be plated on the electrically conductive layer; and performing metal plating on the outside of the button body having the plating shielding layer.

9 Claims, 7 Drawing Sheets

(51) Int. Cl.
*B29D 19/04* (2006.01)
*C08K 5/00* (2006.01)
*C08L 27/06* (2006.01)
*C08L 55/02* (2006.01)
*C25D 5/56* (2006.01)
*C25D 7/00* (2006.01)
*H01H 9/18* (2006.01)
*B29K 27/06* (2006.01)
*B29L 19/00* (2006.01)

(52) U.S. Cl.
CPC ............ *C08K 5/0075* (2013.01); *C08L 27/06* (2013.01); *C08L 55/02* (2013.01); *C25D 5/56* (2013.01); *C25D 7/00* (2013.01); *H01H 9/182* (2013.01); *B29C 2045/0079* (2013.01); *B29K 2027/06* (2013.01); *B29L 2019/00* (2013.01); *C08L 2203/20* (2013.01)

(58) Field of Classification Search
CPC ........ B29C 45/14336; B29C 45/14688; B29C 2045/14704; C25D 5/56
See application file for complete search history.

(56) References Cited

U.S. PATENT DOCUMENTS

| | | | |
|---|---|---|---|
| 5,707,704 A * | 1/1998 | Ako | G03F 1/68 |
| | | | 428/40.1 |
| 5,935,691 A * | 8/1999 | Tsai | B29C 48/19 |
| | | | 428/518 |
| 6,326,569 B1 | 12/2001 | Ardrey et al. | |
| 6,762,381 B2 | 7/2004 | Kunthady et al. | |
| 11,269,127 B2 | 3/2022 | Wang et al. | |
| 2012/0127079 A1 | 5/2012 | Trend et al. | |
| 2019/0206635 A1* | 7/2019 | Jung | C23C 18/32 |

FOREIGN PATENT DOCUMENTS

| | | |
|---|---|---|
| CN | 1397967 A | 2/2003 |
| CN | 2687816 | 3/2005 |
| CN | 101512684 A | 8/2009 |
| CN | 101622919 A | 1/2010 |
| CN | 201750462 | 2/2011 |
| CN | 101989506 | 3/2011 |
| CN | 201773731 | 3/2011 |
| CN | 107369574 | 11/2017 |
| CN | 206877880 | 1/2018 |
| JP | 2003-100172 A | 4/2003 |
| JP | 2003-242853 A | 8/2003 |
| JP | 2003-249139 A | 9/2003 |
| JP | 2004-047379 A | 2/2004 |
| KR | 10-1893195 B1 | 8/2018 |
| KR | 10-2019-0081858 A | 7/2019 |
| TW | 200935563 | 8/2009 |
| WO | 2008/038764 A1 | 4/2008 |

* cited by examiner

SYMBOL BUTTON FOR VEHICLE AND MANUFACTURING METHOD THEREOF

INCORPORATION BY REFERENCE FOR RELATED APPLICATION

This Application is a Division of application Ser. No. 16/568,838 filed on Sep. 12, 2019 which claims priority from Application 10-2018-0157493 filed on Dec. 7, 2018 in the Republic of Korea. The entire contents of these applications are incorporated herein by reference in their entirety.

FIELD

The present disclosure relates to a symbol button for a vehicle, and a manufacturing method thereof.

BACKGROUND

Various switch buttons are applied as vehicular interior parts. The buttons have a typical function for operating or manipulating vehicle parts such as an audio system, an air conditioner, and a window, and have an aesthetic function for visually checking the parts and for feeling the parts with tactile sense when touching them.

Metallic aluminum, metallic paint, matte coating, ion plating, and in-mold film for decoration are applied to vehicular switch buttons.

SUMMARY

One aspect of the present invention provides a symbol button of a vehicle and a manufacturing method thereof that may provide a metallic cool touch feeling and improve merchantability thereof by applying a wet chrome plating surface treatment to buttons that a driver frequently touches with his hand.

Another aspect of the present invention provides a symbol button of a vehicle and a manufacturing method thereof that may form a character/symbol for imparting daytime visibility to a surface of a switch button, and may provide lighting to the character/symbol for night visibility.

An embodiment of the present invention provides a manufacturing method of a symbol button for a vehicle, including: preparing a button body comprising a side portion, a top portion formed of a polymer material on which a metal is able to be plated; forming an electrically conductive layer on an outside of the button body using a conductive polymer material; forming a plating shielding layer in a form of a symbol using a material on which a metal is not able to be plated on the electrically conductive layer; and performing metal plating on the outside of the button body having the plating shielding layer.

In the step of forming an electrically conductive layer on an outside of the button body using a conductive polymer material, the electrically conductive layer may be formed in a closed symbol shape in which an inside and an outside are separated.

In the step of forming a plating shielding layer in a form of a symbol using a material on which a metal is not able to be plated on the electrically conductive layer, the plating shielding layer may be formed in the same symbol shape with a width equal to or less than the width of the electrically conductive layer formed in the closed symbol shape.

Through the step of performing metal plating on the outside of the button body having the plating shielding layer, a metal plating layer may be formed inside and outside the closed symbol.

The step of preparing a button body further includes manufacturing the button body by a single injection method through which the side portion and the top portion is made of a same material; and forming a plating preventing portion at a lower end of the side portion, wherein the plating preventing portion may be made of a material on which a metal is not able to be plated.

The step of preparing a button body further includes manufacturing the button body by a double injection method through which the side portion and the top portion may be made of a different material, and wherein the side portion is made of a material on which a metal is not able to be plated.

The step of the forming an electrically conductive layer may be performed by a method of printing conductive polymer material on the top portion.

The step of forming a plating shielding layer may be performed by a method of printing a plating shielding composition on the electrically conductive layer in a form of a symbol display portion.

The plating shielding composition includes a PVC resin having a molecular weight of 20,000 to 30,000 Mw.

The plating shielding composition includes a PVC resin, a solvent, and an antistatic agent, and the plating shielding composition includes 3 to 7% by weight of a solvent based on 100% by weight of the composition.

The step of performing metal plating may be performed by a wet electroplating method.

Another embodiment of the present invention provides a symbol button for a vehicle, including: a button body comprising a side portion, a top portion; and a symbol display portion positioned on the top portion;
  wherein, the symbol display portion comprises an electrically conductive layer positioned on the top portion and a plating shielding layer positioned on the electrically conductive layer, and wherein, a metal plating layer is disposed in an outside the button except the plating shielding layer.

The electrically conductive layer may be a closed symbol shape in which an inside and an outside are separated.

The plating shielding layer may be the same symbol shape having a width equal to or less than the width of the electrically conductive layer of the closed symbol shape.

A width of the plating shielding layer in the symbol display portion may be narrower than the width of the electrically conductive layer, and a metal plating layer may be disposed in a region where the plating shielding layer is not present in the symbol display portion.

The electrically conductive layer and the plating shielding layer can have a light transmittance of 80% or more.

The electrically conductive layer may have a thickness of 5 to 15 μm.

The plating shielding layer may have a thickness of 5 to 15 μm, and an electrical resistivity of 50 to 75 ohm/sq. In one embodiment, the sum of the thickness of the electrically conductive layer and the thickness of the plating shielding layer may be substantially smaller than that of the metal plating layer such that the symbol is in a form of engraved pattern.

The side portion and the top portion may be made of a same material.

The side portion and the top portion may be made of a different material, the side portion may be made of a material on which a metal is not able to be plated and is non-transparent or opaque, and a metal plating layer is not present on the side portion.

According to embodiments of the present invention, an additional mold is unnecessary when various characters/ symbols are applied at the same position for changing a character/symbol, and it is possible to simplify a process compared to the partial plating using laser cutting after chemical plating.

In the case of implementing closed characters/symbols such as O, P, D, A, etc., metal plating can be formed not only in the symbol outer region but also in the closed symbol inner region, thereby improving symbol visibility.

DETAILED DESCRIPTION OF EMBODIMENTS

Hereinafter, embodiments of the present invention will be described in detail. The embodiments, however, are provided as examples, and the present invention is not limited thereto, but is defined within the range of claims to be described below.

In this specification, when a part is referred to as "comprising/including" an element, it is to be understood that it may include other elements as well, without departing from the other elements unless specifically stated otherwise.

In this specification, the terminology used is for the purpose of describing particular embodiments only and is not intended to limit the invention. The singular forms as used herein include plural forms as long as the phrases do not expressly express the opposite meaning thereto. As used herein, the term "comprising" means that a particular feature, region, integer, step, operation, element and/or component is specified, and it does not exclude existence or addition of other feature, region, integer, step, operation, element, and/or component.

Whenever a portion such as a layer, film, region (area), plate, or the like is referred to as being "on" or "on" another portion, it includes not only the case where it is "directly on" another portion but also the case where there is another portion in between. Also, throughout the specification, the term "on" means to be located above or below a target portion, and does not necessarily mean that the target portion is located on the upper side with respect to the gravitational direction.

All terms including technical terms and scientific terms used herein have the same meaning as commonly understood by those of ordinary skill in the art to which the present invention belongs. Commonly used predefined terms are further interpreted as having a meaning consistent with the relevant technical literature and the present disclosure, and are not to be construed as ideal or very formal meanings unless defined otherwise.

Thus, in some embodiments, well-known techniques are not specifically described to avoid an undesirable interpretation of the present invention.

For decorating switch buttons in vehicles, metallic aluminum, metallic paint, matte coating, ion plating, and in-mold film are used. The ion plating and the metallic paint are used for providing metallic texture to switch buttons, but since there is a difference between feeling when seeing them with the naked eye and feeling when touching them, there is a detriment in terms of marketability. Thus, alternatively, a method of plating a metal on a button surface of a polymer material may be used.

Figure 1:
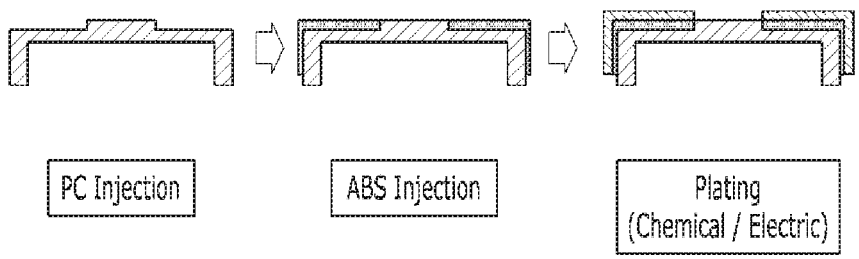
FIG. 1 illustrates a schematic diagram of a multiple injection partial plating method.

In metal plating method, there are two types. A first type thereof is a multiple injection partial plating method. FIG. 1 is a schematic view of the multiple injection partial plating method. In this method, different materials are injected into and bonded to a plating area and a non-plating area for the partial plating. A polycarbonate material is firstly injected so that a shape of a desired symbol (character or pattern) is formed for the formation of the non-plating area, and a metal-platable ABS or PC+ABS material is injected onto a surface thereof. In this method, molten ABS or PC+ABS is bonded to a PC material. Thereafter, when wet chrome plating (chemical plating+electroplating) is performed, a plating layer is formed only on an ABS or PC+ABS surface, and the PC material becomes a non-plating area.

According to this method, since a new mold is required every time the symbol is changed, a mold investment increases, and plating failure occurs when injection failure occurs due to insufficient flowability during injection molding.

Figure 2:
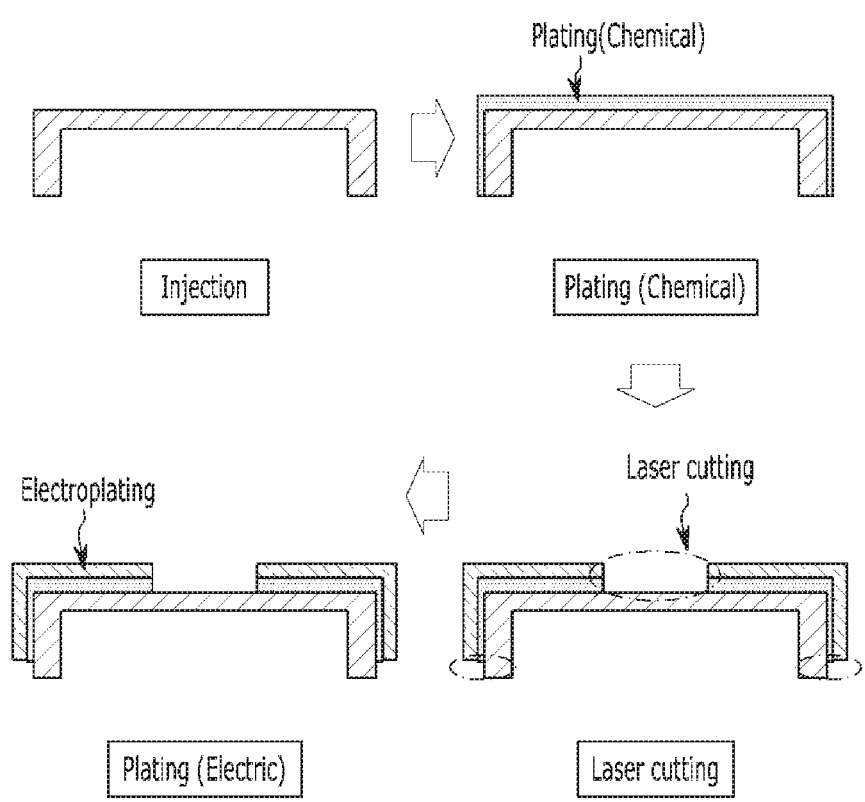
FIG. 2 illustrates a schematic diagram of a laser cutting partial plating method.

A second type thereof is a laser cutting partial plating method. FIG. 2 is a schematic diagram of a laser cutting partial plating method. A plastic plating process includes a sequential process in which conductivity is imparted to a non-conductive injection material by chemical plating and then a metal layer is formed by electroplating, and this equally applies to the above-described plastic plating.

The laser cutting partial plating method is a method of forming a symbol, a pattern, etc. on a product surface by partially removing a chemical plating layer by using laser cutting after chemical plating and then performing electroplating.

However, in the laser cutting partial plating including the sequential process, it would be difficult to take out a product from a plating jig after the chemical plating, laser-cutting the product, and then mount it again on the plating jig to perform the electroplating thereon.

In view of the foregoing, a metal plating method that may more effectively form symbols on plastics is desired.

An embodiment of the present invention provides A manufacturing method of a symbol button for a vehicle, including: preparing a button body comprising a side portion, a top portion formed of a metal-platable polymer material on which a metal is able to be plated; forming an electrically conductive layer on an outside of the button body using a conductive polymer material; forming a plating shielding layer or plating blocking layer in a form of a symbol using a material on which a metal is not able to be plated on the electrically conductive layer; and performing metal plating on the outside of the button body having the plating shielding layer. By embodying the symbol through the region where the plating shielding layer is present, the driver can distinguish the symbol with the naked eye, and the metal appearance and the metal cool touch feeling can be given to the button for the automobile through the metal plating layer.

Since a button according to an embodiment of the present invention includes an electrically conductive layer below the plating shielding layer, when the electroplating is performed, the enclosed symbol inner area and the outer area are energized through the electrically conductive layer. Therefore, it is possible to form a metal plating layer not only on the outside of the symbol having the closed shape of the outside but also on the closed symbol inside area.

Therefore, there is no need to change the symbol for the energization of the closed form symbol inside area, and the sign visibility can be improved.

When the electrically conductive layer and the plating shielding layer are made of a material having optical transparency, the portion where the metal plating layer is formed is shielded from light and the illumination is implemented through the region where the plating shielding layer exists at night. Accordingly, the visibility of the symbol button for the automobile can be secured.

Another embodiment of the present invention provides a symbol button for a vehicle, including: a button body comprising a side portion, a top portion; and a symbol display portion positioned on the top portion;

wherein, the symbol display portion comprises an electrically conductive layer positioned on the top portion and a plating shielding layer positioned on the electrically conductive layer, and wherein, a metal plating layer is disposed in an outside the button except the plating shielding layer.

Figure 3:
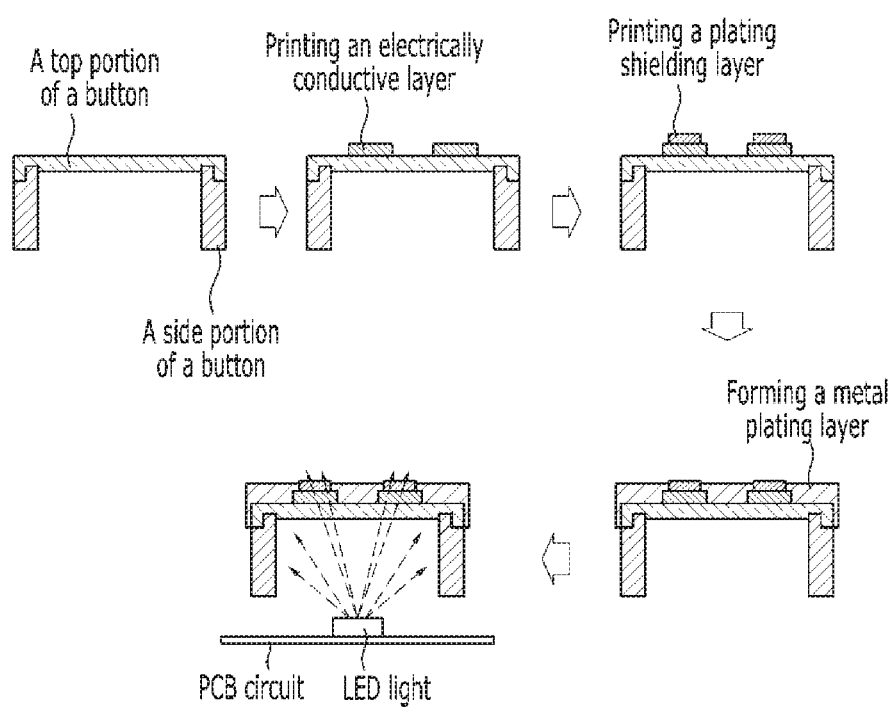
FIG. 3 illustrates a flowchart of a manufacturing method of a button according to an embodiment of the present invention.

FIG. 3 is a flowchart of a method of manufacturing a button according to an embodiment of the present invention. An embodiment of the present invention provides A manufacturing method of a symbol button for a vehicle, including: preparing a button body comprising a side portion, a top portion formed of a polymer material on which a metal is able to be plated; forming an electrically conductive layer on an outside of the button body using a conductive polymer material; forming a plating shielding layer in a form of a symbol using a material on which a metal is not able to be plated on the electrically conductive layer; and performing metal plating on the outside of the button body having the plating shielding layer.

The top portion is required to a metal-platable material on which a metal is able to be plated. In addition, the top portion may be a semi-transparent or transparent material. In other words, it can be made of a material having light transmittance, and in this case, night view visibility can be ensured by implementing illumination. Specifically, it may be made of ABS, PC+ABS or PC material having metal plating ability.

In the step of preparing the button body, the side portion and the top portion may be manufactured by a single material injection method through which the side portion and the top portion is made of a same material or a double material injection method through which the side portion and the top portion is made of a different material.

Figure 4:
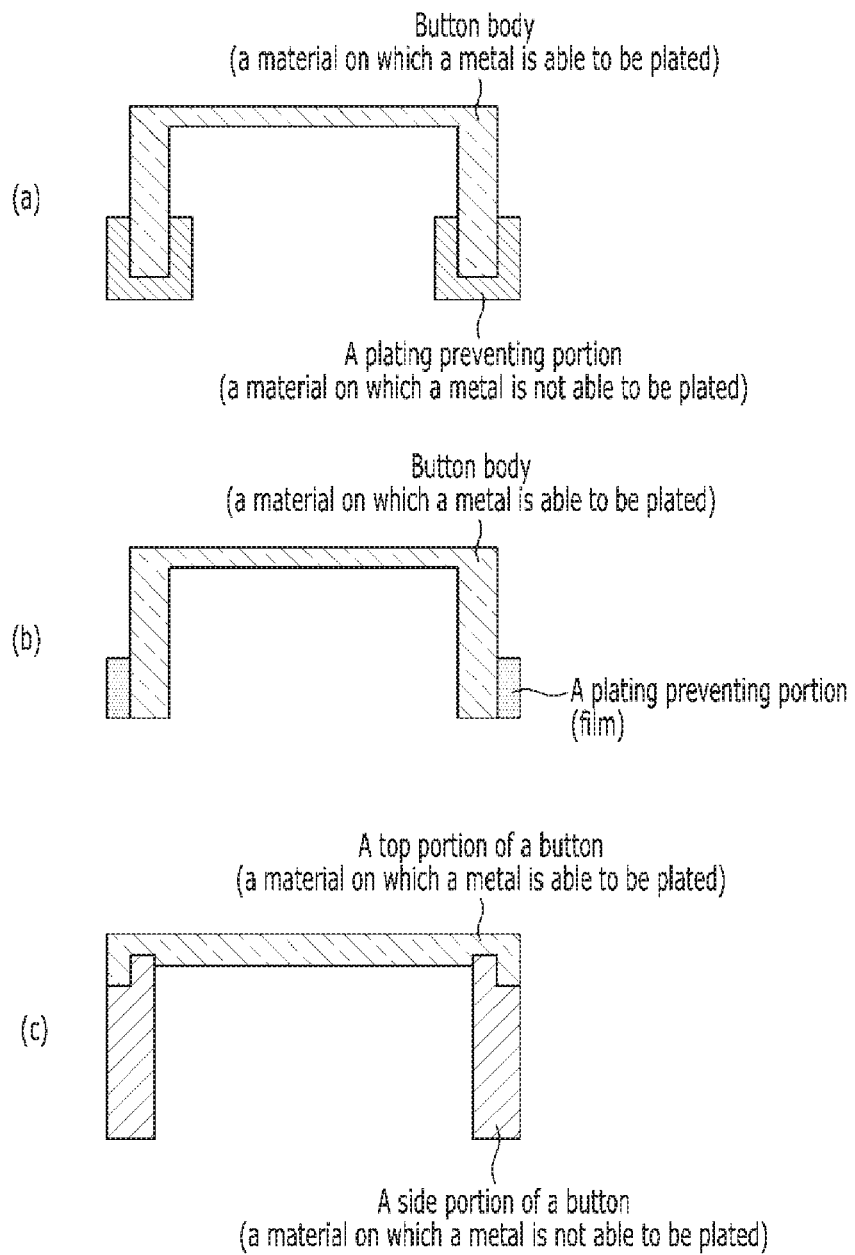
FIG. 4 shows a button body according to an embodiment of the present invention.

FIGS. 4(a) and 4(b) show a button body manufactured by a single material injection method. In this case, the side portion may be made of a polymer material that can be plated with the same material as the top portion. When a button body is made of a polymer material capable of being metal-plated as described above, there is a problem that a metal plating layer is formed inside the button body when the electroplating is performed in a subsequent process so that light is not transmitted. Also, there may arise a problem electrically energizing with an illumination configuration (LED or the like) located inside the button body. Therefore, a plating preventing portion is formed by using a material that is not able to be plated with metal at the lower end of the side portion, thereby preventing a metal plating layer from being formed inside the button body. The plating preventing portion may be removed after the button manufacturing is completed, or may be used without being removed.

The step of forming the plating preventing portion may be performed by dipping or pad printing a plating shielding composition or by plating after attaching a film of PVC, TPU, or PP, which does not react with plating chemicals. At this time, the material of the film may be PVC, TPU, PP film, but preferably PVC film is the most excellent. For example, the PVC material 3M Automotive Grade high adhesion Scotchcal™ can be used.

FIG. 4(c) shows a button body manufactured by a different material injection method. In this case, the side portion may be a polymer material that is not able to be plated with metal, so that a metal plating may be prevented from being formed inside the button without forming the plating preventing portion separately. By maintaining the gap between the PCB circuit and the metal plating layer, it is possible to prevent the circuit damage by energization during the electrostatic discharge. Further, the side portion may be made of a material having no light transmittance. In this case, it is possible to block the light leakage to the side. Specifically, the side portion may be made of a material selected from the group consisting of PC, TPU, and a mixture thereof, on which the metal is not plated. However, when the top portion is a PC, the side portion may be limited to the TPU.

The button body may have a thickness of 1.0 to 1.5 mm. When the thickness is too thin, the moldability at the time of injection may be deteriorated. When the thickness is too thick, the light transmittance is lowered to 5 or less, and the HAZE is 95 or more, so that lighting is difficult to implement.

The step of forming the electrically conductive layer may be performed by printing a conductive polymer material on the top portion.

The electrically conductive layer enables energization of the enclosed form inside and outside, thereby enabling formation of an electroplating layer in the closed form of the symbol. When it is made of a material having light transmittance, the light can be transmitted, thereby ensuring visibility at night.

The step of forming the electrically conductive layer may be performed by printing the electrically conductive composition on the top portion. The conductive composition may be composed of a polymer material having light transmittance. In one embodiment herein, an electrically conductive layer was formed using Henkel's LOCTITE® ECI 5005 transparent conductive ink. In this case, it is possible to form a light-transmitting electrically conductive layer having a conductivity as high as ~55 ohm/sq at 305/34 mesh and a light transmittance of 90% or more and a HAZE of 2% or less by a simple process.

The electrically conductive layer may have a thickness of 5 to 15 μm. When the thickness is too thin, the electrical conductivity is lowered, and a metal plating layer may not be formed in the closed area of the closed form in plating. If it is too thick, the printing quality may be lowered due to ink flow after printing.

In the step of forming the electrically conductive layer, the electrically conductive layer may be formed in a closed symbol shape in which the inside and the outside are separated. In this case, even if the area of the electrically conductive layer is reduced, the outer region and the inner region in the closed symbol form can be energized, and a metal plating layer can be formed in the inner region of the closed symbol type. Accordingly, a manufacturing cost can be reduced.

The step of forming the plating shielding layer may be performed by a method of printing the plating shielding composition in the form of a symbol display portion on the electrically conductive layer. The printing method may be performed by pad printing, screen printing, laser printing, or the like.

After the plating shielding composition is printed, the plating shielding composition can be cured by drying at a temperature of 60 to 80° C. for 0.5 to 2.0 hours.

The plating shielding composition may include a PVC resin, a solvent, and an antistatic agent.

The plated shielding composition should have properties such that it is not eroded or peeled off by the plating agent during the plating process.

PVC resin has excellent chemical resistance against sulfuric acid, chromic acid, hydrochloric acid, and the like in the etching step of the subsequent metal plating process, and the metal is not plated even when the metal plating process is performed. Specifically, the PVC resin may have a molecular weight of 15,000 to 25,000 Mw. More specifically the PVC resin may have a molecular weight of 2000 to 3000 Mw.

The composition may contain 3 to 7% by weight of solvent based on 100% by weight of the plating shielding composition. The solvent is used to control the viscosity of the plating shielding composition and to disperse the resin, thereby ensuring the printing workability. Specific examples of the solvent include Acetonitrile, ISOPHORONE, XYLENE, and the like. The viscosity of the plated shielding composition may be 2000 cP to 5000 cP. If the amount of the solvent is too large, the viscosity of the plating shielding composition is lowered to less than 2000 cP, printing spreading becomes severe, and it may be difficult to secure the film thickness. If the amount of the solvent is too small, the viscosity becomes too high, the dispersibility may deteriorate, and the plating shielding composition may remain on the pad without being printed smoothly during printing, resulting in deterioration of printability.

The plating shielding composition may further comprise a curing agent. If a curing agent is further included, the durability properties such as chemical resistance, heat resistance, adhesion and the like, can be increased. Specifically, the curing agent may be included in an amount of 10 to 20 parts by weight based on 100 parts by weight of the plating shielding composition. If too much curing agent is included, the printability may be degraded and the pot life of the plating shielding composition due to air exposure may be shortened. If the amount of the curing agent is too small, cracking of the coating film due to over-curing may occur.

The plating shielding composition may be composed of a material having light transparency. In this case, since a metal plating layer is not formed in a portion where the plating shielding layer is formed, illumination through the plating shielding layer can be realized. Therefore, night visibility of the symbol button for automobile can be secured.

The plating shielding layer may have a thickness of 5 to 15 μm and an electrical resistance of 50 to 75 ohm/sq. When the above range is satisfied, a formation of a metal plating layer on the plating shielding layer region can be suppressed. If the thickness of the plating shielding layer is too thin, it may be eroded or peeled off by the acid solution in the subsequent plating process, and if it is too thick, the printing quality may be deteriorated or the appearance of the finished product may be deteriorated.

In the step of forming a plating shielding layer in a form of a symbol using a material on which a metal is not able to be plated on the electrically conductive layer, the plating shielding layer may be formed in the same symbol shape with a width equal to or less than the width of the electrically conductive layer formed in the closed symbol shape. If the plated shielding layer is formed to have the same width as the width of the electrically conductive layer, the amount of expensive transparent conductive ink used can be reduced to reduce the manufacturing cost.

When the plated shielding layer is formed to be narrower than the width of the electrically conductive layer, alignment of the symbol shape is easy. In addition, plating defects due to printing defects of the plating shielding layer and/or the electrically conductive layer, and product defective ratio can be reduced.

The step of performing the metal plating on the outside of the button body having the plating shielding layer may be an electroplating method. Specifically, wet chrome plating can be performed.

Wet chromium plating can be roughly divided into an etching step, a chemical plating step, and an electroplating step.

The etching step (pretreatment) serves to dissolve the butadiene component by using chromic acid or sulfuric acid on the surface of ABS or PC+ABS, and to form an anchor hole, thereby realizing the plating adhesion.

Chemical plating is a process for imparting conductivity to the surface of a non-conductive plastic injection material to form a thin chemical nickel plating layer (1 μm).

Electroplating implements copper/nickel/chrome sequentially by applying electricity to the product surface.

In the case of the plating shielding layer, since the PVC material is not dissolved in chromic acid or sulfuric acid, a chemical nickel plating layer is not formed, and a plating layer is not formed in the electroplating.

The electrically conductive layer and the plating shield layer may have a light transmittance of 80% or more. In this case, since an illumination member such as an LED or the like is disposed inside the button, lighting can be implemented through the portion where the plating shielding layer exists, and night visibility can be ensured. If the light transmittance is too low, visibility at night may be insufficient.

EXAMPLE

Hereinafter, examples and comparative examples will be described. However, the present invention is not limited to the following examples.

Selection of Injection Material for Plating

A condition required for a transparent injection material for plating is to be able to have plating adhesion force and lighting.

ABS, PC+ABS, and PC materials are available. In a product, a thickness thereof is 1.0 to 1.5 mm.

When the thickness of the material is 1.0 mm or less, flowability of the material is insufficient, thus moldability upon injection is deteriorated. When the thickness of the material is 2.0 mm or more, total light transmittance is 5 or less and HAZE is 95 or more, so that the light transmittance is decreased, thus it is difficult to apply to a lighting part.

Selection of Electrically Conductive Material

The electrically conductive layer is required to have electrical conductivity since it functions to energize the enclosed inner and outer regions when electroplating.

An electrically conductive layer was formed using Henkel's LOCTITE® EC15005 transparent conductive ink. In this case, it was confirmed that the conductivity had a high conductivity of ~55 ohm/sq at 305/34 mesh, a light transmittance of 90% or more, and a HAZE of 2% or less.

Selection of Ink Resin

In order to realize printing for preventing a plating layer from being formed on a character/symbol portion, PVC, PMMA, and PU resins applicable to a plastic material were evaluated.

The PMMA or PU resin was dissolved in chemicals such as sulfuric acid, hydrochloric acid, and chromic acid in the plating process, thus the printing layer was removed or the plating layer was formed on the surface thereof even if the printing layer remained. In the case of the PVC resin, since the chemical resistance thereof was strong, the printing layer was not removed even after the chrome plating process, thus the plating layer was not formed.

In the case of the PVC resin, regardless of the molecular weight thereof, no plating layer was formed after the wet chrome plating.

The preferable molecular weight of the PVC resin is 20,000 to 30,000 Mw.

When the molecular weight of the PVC resin is less than 20,000 Mw, printing capability is deteriorated due to printing spread, and it is difficult to secure a printed thickness after printing.

When the molecular weight of the PVC resin is more than 30,000 Mw, the slip property of the resin is degraded such that the ink surface after the printing becomes rough, and the sharpness of the image is degraded due to printing spread such that a repeated printing is difficult; and further the uniformity of the plating is degraded such that the character/symbol is not constant.

In the printing, it is possible to form characters and symbols by pad printing, screen printing, and laser printing methods.

An organic solvent is used to ensure the printability of the PVC resin. The organic solvent serves to adjust viscosity and to disperse the resin.

In this case, the organic solvent may be acetonitrile, isophorone, or xylene.

The content of the solvent is preferably about 3 to 7 wt % with respect to the resin.

When the content of the solvent is less than 3 wt %, the viscosity of the ink solution is as high as 5000 cP, so that the dispersibility is degraded. In addition, when the viscosity thereof is high, the ink is not transferred to an injection product during the pad printing, but remains on a pad (silicone rubber), so that the printability is degraded.

When the content of the solvent is more than 7 wt %, the viscosity of the ink solution is as low as 2000 cP or less, so that the printing spread becomes serious, and it becomes difficult to secure a thickness of a coating film after printing and drying.

A curing agent is used for increasing durability properties such as chemical resistance, heat resistance, and adhesion force through curing with the PVC resin, it includes an isocyanate-based curing agent, it may preferably include HDI, MDI, TDI, or IPDI, and it is preferable to apply the content of 20 parts by weight.

When the content of the curing agent is less than 10 parts by weight, the chemical resistance is degraded due to insufficient curing of the coating film, and when the content of the curing agent is more than 20 parts by weight, the durability properties are improved, but the printability is degraded, and the pot life of the ink is shortened due to exposure to air. In addition, due to excessive curing with the resin, cracking of the coating film occurs after evaluation of light resistance.

FIG. 3 illustrates a flowchart of a manufacturing method of a button according to an embodiment of the present invention.

Figure 5:
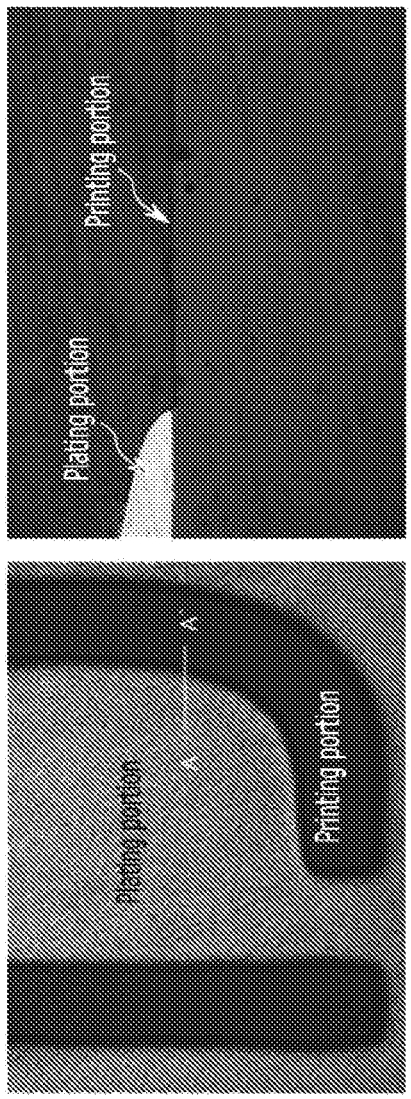
FIG. 5 illustrates criteria for determining printing failure.

FIG. 5 illustrates criteria for determining printing failure.

Figure 6:
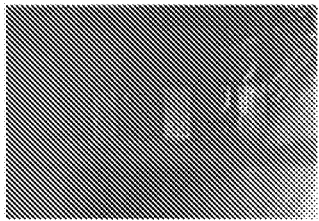
FIG. 6 illustrates criteria for determining chemical resistance.

FIG. 6 illustrates criteria for determining chemical resistance. The chemical resistance test was judged to be enough to wipe off the print 10 times with 500 g load after sufficiently wetting the gauze with chemicals.

TABLE 1

|  | #1 | #2 | #3 | #3 | #4 | #5 |
|---|---|---|---|---|---|---|
| Resin type | PVC (Molecular weight 10,000) | PVC (Molecular weight 20,000) | PVC (Molecular weight 30,000) | PVC (Molecular weight 40,000~) | PMMA (Molecular weight 10,000 or less) | PU (Acryl urethane) |
| Printability | Δ | ◎ | ◎ | Δ | ◎ | ◎ |
| Non-plating performance | ◎ | ◎ | ◎ | ◎ | X | X |
| Light transmittance | ◎ | ◎ | ◎ | ◎ | ◎ | ◎ |

TABLE 2

|  | #6 | #7 | #8 | #9 | #10 | #11 | #12 | #13 |
|---|---|---|---|---|---|---|---|---|
| Resin type | PVC (Molecular weight 20,000) | PVC (Molecular weight 20,000) | PVC (Molecular weight 20,000) | PVC (Molecular weight 20,000) | PVC (Molecular weight 20,000) | PVC (Molecular weight 20,000) | PVC (Molecular weight 20,000) | PVC (Molecular weight 20,000) |
| Resin | 30 | 50 | 70 | 90 | 90 | 90 | 90 | 90 |
| Solvent | 70 | 47 | 30 | 7 | 7 | 7 | 3 | 10 |
| Antistatic agent |  | 3 |  | 3 | 3 | 3 | 7 |  |
| Total | 100 wt % | 100 wt % | 100 wt % | 100 wt % | 100 wt % | 100 wt % | 100 wt % | 100 wt % |
| Curing agent |  | 10 parts by weight |  | 20 parts by weight | 10 parts by weight | 30 parts by weight | 20 parts by weight | 20 parts by weight |

TABLE 2-continued

| | #6 | #7 | #8 | #9 | #10 | #11 | #12 | #13 |
|---|---|---|---|---|---|---|---|---|
| Printing failure | ○ (printing spreading) | ◎ | ○ (printing spreading) | ◎ | ◎ | X (unprinted, short using time) | X (unprinted, viscosity increase) | ○ (printing spreading) |
| Chemical resistance (ethanol/gasoline) | X | ○ | X | ◎ | ○ | ◎ | ◎ | ◎ |

Formation of a Metal Plating Layer in the Closed Area of the Closed Symbol

Figure 7:
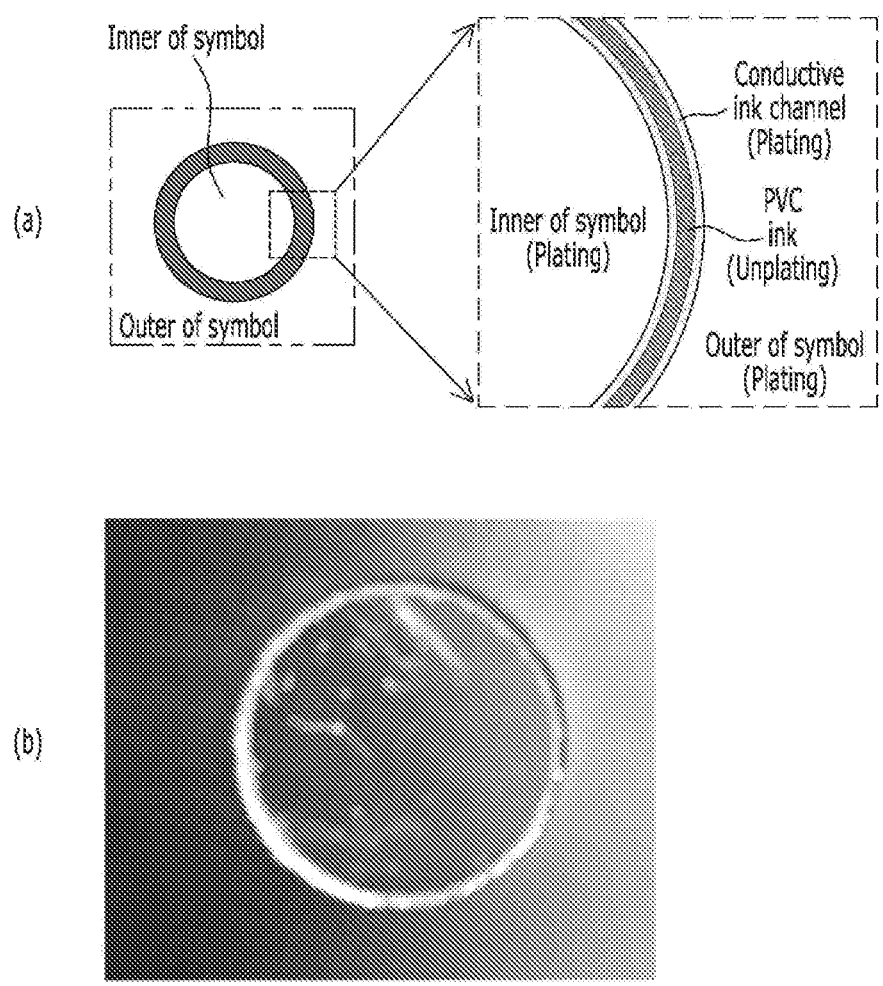
FIG. 7 is a formation of an electrically conductive layer and a plating shielding layer, and an enlarged view of a top portion of a button embodying a closed symbol.

As shown in FIG. 7, an electrically conductive layer was formed in a circular shape having a closed shape, and a plating shielding layer was formed on the electrically conductive layer with a width narrower than the width of the electrically conductive layer, followed by wet chrome plating.

In the region where the plating shielding layer is formed, the metal plating layer is not formed in the symbol portion, and the plating layer is formed in the inside of the circle symbol which is closed by the electroplating. That is, according to one embodiment of the present invention, it is understood that the plating layer can be formed by electroplating also in the closed-form symbol interior region by including the electrically conductive layer.

In embodiments of the present invention, a conductive layer and a plating shielding layer are formed on the surface of a metal-platable material by using a pad or screen printing method and metal plating is performed to form a metal plating layer only in the remaining region except for the plating shielding layer region. Further, by configuring a top portion, the electrically conductive layer, and the plating shielding layer by using a light-transmitting material, the light is transmitted only to the plating shielding layer region to provide an image of character/symbol in the daytime and a lighting image in the nighttime.

In embodiments of the present invention, by forming the plating shielding layer on the electrically conductive layer, the closed-form, symmetric inner region can be energized with the outer region during electroplating, so that not only the outer region of the symbol but also the inner region of that have metal plating. Therefore, it is possible to provide a symbol button for a vehicle with improved symbol visibility.

It will be understood by those skilled in the art that various changes in form and details may be made therein without departing from the spirit and scope of the present invention as defined by the following claims. It is therefore to be understood that the above-described embodiments are illustrative in all aspects and not restrictive.

The invention claimed is:

1. A manufacturing method of a symbol button for a vehicle, comprising:
   preparing a button body comprising a top portion and a side portion, wherein the top portion is formed of a polymer material that is metal-platable
   forming an electrically conductive layer on an outer surface of the button body using a conductive polymer material;
   forming, over the electrically conductive layer, a plating shielding layer in a form of a symbol using a plating shielding composition that is not metal-platable, wherein the plating shielding layer covers at least a portion of the electrically conductive layer; and
   performing metal plating to form a metallic layer on the outer surface of the button body:
   wherein preparing a button body further comprises manufacturing the button body by a double injection method through which the side portion and the top portion are made of different materials from each other; and
   wherein the side portion is made of a material that is not metal-platable.

2. The method of claim 1, wherein, when forming an electrically conductive layer, the electrically conductive layer is formed in a form of the symbol that includes at least a line forming a closed loop shape such that the outside surface comprises an inside region located inside the closed loop and an outside region located outside the closed loop.

3. The method of claim 2, wherein, when forming a plating shielding layer, the plating shielding layer is formed in the same symbol shape comprising at least a line forming a closed loop that overlaps the closed loop of the electrically conductive layer, wherein the at least a line of the plating shielding layer has a width equal to or less than the width of the at least a line of the electrically conductive layer.

4. The method of claim 3, wherein when performing metal plating, a metal plating layer is formed on the inside region and the outside region.

5. The method of claim 1, wherein forming an electrically conductive layer comprises printing the electrically conductive polymer material on the outer surface of the button body.

6. The method of claim 1, wherein forming a plating shielding layer comprises printing the plating shielding composition on the electrically conductive layer.

7. The method of claim 6, wherein the plating shielding composition comprises a PVC resin having a molecular weight of 20,000 to 30,000 Mw.

8. The method of claim 6, wherein the plating shielding composition comprises a PVC resin, a solvent, and an antistatic agent, and wherein the plating shielding composition comprises 3 to 7% by weight of a solvent based on 100% by weight of the composition.

9. The method of claim 1, wherein metal plating is performed by a wet electroplating method.

* * * * *